United States Patent [19]

Hehl

[11] 3,836,301

[45] Sept. 17, 1974

[54] INJECTION MOLDING MACHINE WITH LIFTING DEVICE

[76] Inventor: Karl Hehl, Siedlung 183, Lossburg, Wuerttemberg, Germany

[22] Filed: Jan. 31, 1973

[21] Appl. No.: 328,491

[30] Foreign Application Priority Data
Feb. 8, 1972  Germany............................ 2205782

[52] U.S. Cl. ............................................. 425/192
[51] Int. Cl............................................... B29f 1/00
[58] Field of Search ........... 425/192, 185; 214/75 H

[56] References Cited
UNITED STATES PATENTS
2,565,091  8/1951  Reed................................. 214/75 H
2,643,620  6/1953  Miller................................ 425/192
3,113,681  12/1963  Crile.................................. 214/75 H Primary Examiner—Richard J. Herbst
Attorney, Agent, or Firm—Joseph A. Geiger

[57]  ABSTRACT

The suggested lifting device for the injection molding machine includes a rotatable vertical column with a horizontal arm that carries an electric chain hoist for the purpose of conveniently lifting the injection unit or other heavy machine components from one position to another. The vertical column is rotatably supported on a carriage which is adjustably mounted on the die closing unit itself for central location and maximum stability.

15 Claims, 3 Drawing Figures

INJECTION MOLDING MACHINE WITH LIFTING DEVICE

BACKGROUND OF THE INVENTION

1. Field of the Invention

The present invention relates to injection molding machines, and in particular to heavy duty injection molding machines which require a lifting device for the handling and installation of the various machine components, the lifting device being preferably a hoist which is mounted on a rotatable vertical column.

2. Description of the Prior Art

The arrangement of a built in lifting device on heavy duty injection molding machines is known in the prior art. A known machine of this kind has a service hoist whose supporting structure is arranged on one side of the base of the injection molding machine and supported by the foot of that machine base. Such a service hoist makes it possible to conveniently and quickly perform assembly and rearrangement tasks on the injection molding machine which would otherwise require considerable physical effort and the cooperation of several people. With the hoist one operator alone can effortlessly replace injection molds or change the position of the injection unit on the injection molding machine. Such a solution is proposed in German Gebrauchsmuster (Utility Model) No. 1,976,368.

The prior art arrangement just mentioned has the shortcoming that the permanent installation of the support structure for the hoist prevents an obstruction on one side of the machine, limiting servicing access and observation of its operation. It may therefore be necessary to remove this lifting device in order to maintain the desired work freedom for the machine operator. A second shortcoming of this prior art solution is the fact that the support structure, which has to reach from the foot of the machine base to a sufficient height above the injection molding machine, requires comparatively heavy components in order to provide the necessary rigid support for an electric chain hoist.

SUMMARY OF THE INVENTION

It is an objective of the present invention to eliminate the earlier mentioned shortcomings. The invention proposes to attain this objective by suggesting an injection molding machine with a lifting device which is arranged in the center plane of the machine, the hoist support structure being mounted directly on the die closing unit. This result can be achieved simply and inexpensively by providing the hoist support structure in the form of a vertical column which is rotatably supported in a mounting socket which in turn is mounted on top of the die closing unit. Not only is this novel lifting device much lighter in weight than comparable prior art devices and therefore easier to remove and install on the machine, but it can be left installed on the machine during production runs, because it does not diminish the accessibility of the various machine units for servicing and inspection.

The centrally located rotatable vertical column which is preferably tubular in profile, provides for optimal static load conditions on the lifting device by permiting the use of a horizontal hoist support arm of miminal length. The support for the vertical column is preferably provided in the form of a rotation socket which is part of a mounting carriage, the latter being arranged in such a way that it can be moved longitudinally relative to the die closing unit on which it is mounted. The hoist support structure thus mounted directly on top of the injection molding machine is considerably shorter and lighter than comparable prior art devices, and it is therefore easier to handle without sacrificing stability and lifting capacity. As mentioned earlier, this lifting device may remain installed on the machine during production operations.

The guides and mounting elements for the supporting carriage of the lifting device are preferably provided as an integral part of the stationary die support in the die closing unit.

Applicant's copending application Ser. No. 234,034 filed Mar. 13, 1972, now Pat. No. 3,761,214, discloses in detail a preferred die closing unit with two or four parallel horizontal hydraulic cylinders which produce the opening and closing motion of the movable half of the injection molding die. The stationary cylinder mount inside which the cylinders are arranged also carries the stationary die support, and in the novel arrangement of this invention also carries the lifting device.

The novel support carriage for the vertical column of the lifting device may conveniently be arranged to also provide a support for the injection unit when the latter is mounted for injection in the separation plane of the die. The longitudinal adjustablilty of the support socket then permits alignment of the injection unit to the precise location of the die separation plane.

BRIEF DESCRIPTION OF THE DRAWINGS

Further special features and advantages of the invention will become apparent from the description following below, when taken together with the accompanying drawings which illustrate, by way of example, a preferred embodiment of the invention represented in the various figures as follows.

DESCRIPTION OF THE PREFERRED EMBODIMENTS

Figure 1:
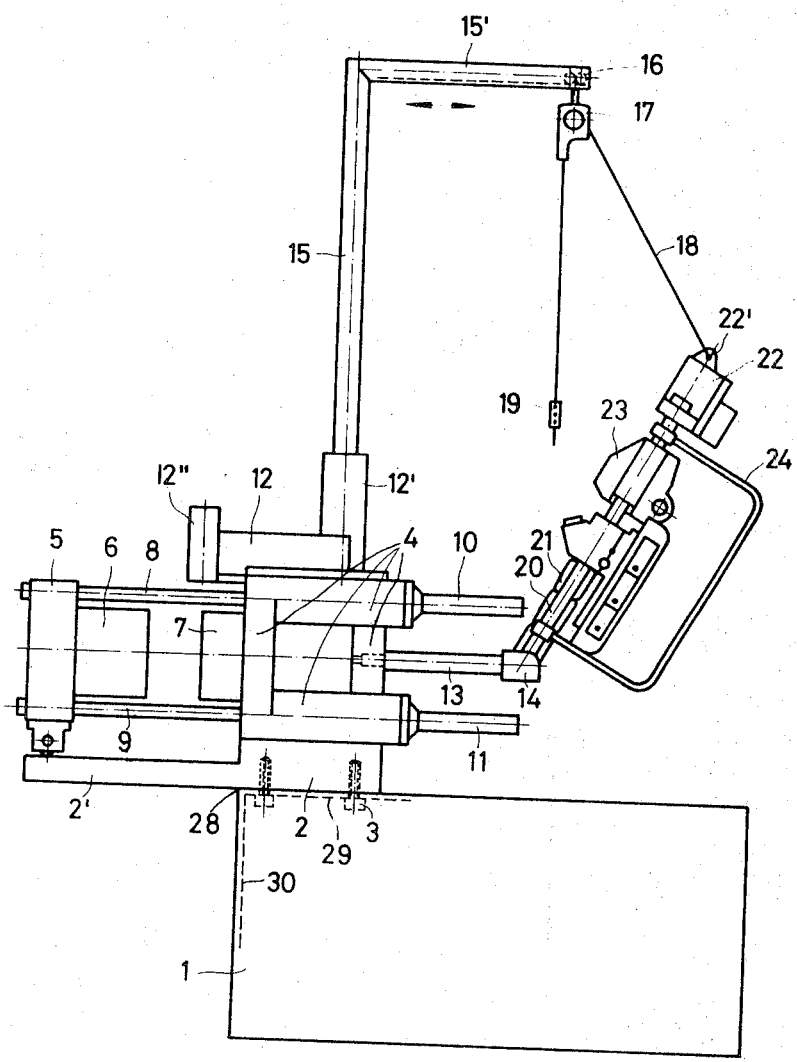
FIG. 1 shows in a schematic representation an elevational side view of an injection molding machine, including a lifting device to which an injection unit is hooked, illustrating an embodiment of the invention.

The injection molding machine of FIG. 1 consists essentially of a block-shaped machine base 1 which is provided with a horizontal upper mounting face 29 on which are mounted the operational units of the machine itself, viz. a die closing unit and an injection unit. On its forward end the machine base 1 has a vertical mounting face 30 which is contiguous with the horizontal mounting face 29 at the reference edge 28 so as to permit selective horizontal or vertical installation of the die closing unit on the machine base 1. The die closing unit may be mounted on the machine base 1 by means of an intermediate support frame 2, 2', or it may be mounted directly on the machine base 1 without such a support frame. For heavy die closing units, which have long piston rods 9 for long opening strokes, the support frame 2, 2' provides a supporting guide for the movable die support on its cantilever arms 2'.

The die closing unit itself includes on its right hand side a stationary cylinder mount 4 which also carries the stationary die support 7. The cylinder mount 4 and die support 7 may be provided in the form of a single casting. The cylinder mount 4 accommodates four parallel hydraulic cylinders, the cylinder main bores being provided directly inside the cylinder mount 4, while additional long-stroke cylinders 10 and 11 mounted coaxially thereto on the backside of the cylinder mount. The hydraulic cylinders 10 and 11 thus provide the opening and closing motion of the die, while the main cylinders inside cylinder mount 4 produce the closing pressure for the die closing unit. On the extreme end of the four cylinder rods 8, 9, which extend forwardly from the cylinder mount past the stationary die support 7, is attached the movable die support 5 which carries the movable die half 6 so as to face the stationary die half 7.

To the upper side of cylinder mount 4 is clampably attached a mounting carriage 12 which carries the lifting device of the invention in a support socket 12'. The carriage itself is longitudinally guided relative to the cylinder mount by means of guide profiles $12^{IV}$ (FIG. 2) which engage matching guide elements of the cylinder mount 4. The mounting carriage 12 is preferably centered with respect to the die closing unit and longitudinally adjustable along to the center axis of the machine.

Figure 2:
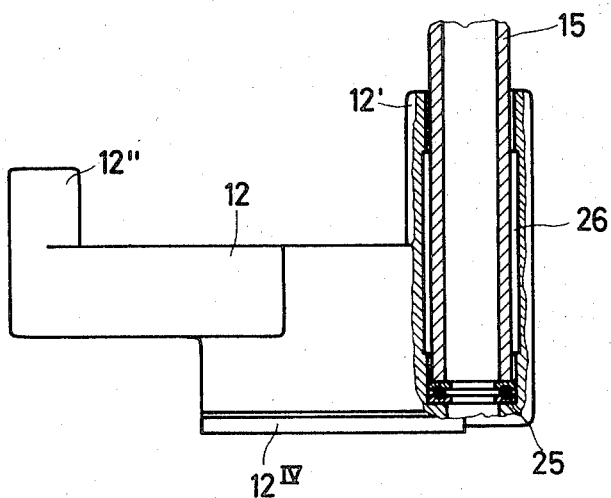
FIG. 2, shows in an enlarged, partially cross-sectioned elevation, the support socket and lower portion of the column for the lifting device of the embodiment of FIG. 1.
Figure 3:
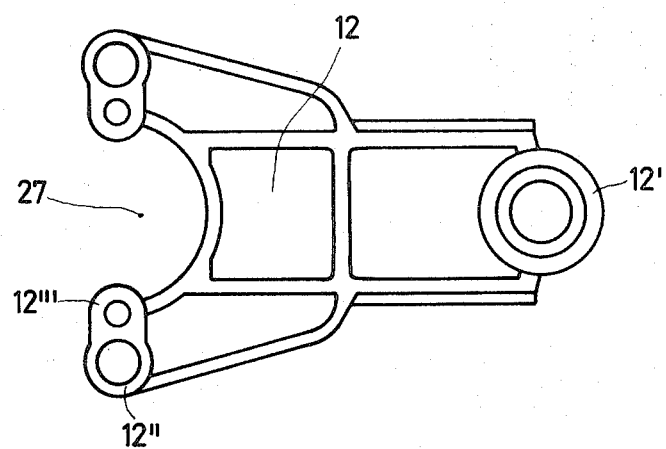
FIG. 3 shows the support socket of FIG. 2 in an plan view.

The support carriage 12 as illustrated in FIGS. 2 and 3 further includes on its forward extremity two spaced, vertically oriented mounting sockets for the attachment of an injection unit. The mounting sockets include a set of large mounting bores 12'' and a set of smaller, closer spaced mounting bores 12''' for the insertion of the mounting trunnions of corresponding heavy or light injection units. The open space 27 provided between the two mounting sockets on the support carriage 12 provides an access channel for the hoist chain to the stationary die half 7. On its rear end the mounting carriage 12 includes a vertically oriented support socket 12' for the tubular vertical column 15 of the lifting device. In the bottom of support socket 12' is further arranged a thrust bearing 25 which supports the weight of the lifting device and any load attached thereto, while permitting easy rotation of the latter. The bore of the supporting socket 12' includes an upper and lower guide portion for column 15 with a recess 26 of larger diameter arranged therebetween.

The rotational support of column 15 inside the supporting socket 12' permits unobstructed 360° rotation of the lifting device around the vertical axis of column 15. On the upper end of the latter is arranged a cantilever-type support arm 15' which extends horizontally from column 15. The cross-section of support arm 15' is preferably square-tubular and includes a longitudinal center slot in its bottom wall. Inside the hollow support arm 15' is movably arranged a hoist dolly 16 which is capable of moving between the near and far ends of the support arm 15'. From the dolly 16 is suspended an electric motor hoist which includes a lifting chain 18, or a suitable lifting cable, and a suspended switching unit 19 for the control of the hoist 17. The free end of the lifting chain (not shown) is preferably accommodated inside the hollow vertical column 15 into which it enters through a lateral opening. The electrical supply lines for the hoist motor are likewise preferably arranged to run inside the hollow column 15 and support arm 15'.

FIG. 1 shows an injection unit as it is being lifted by the lifting device during removal or installation on the injection molding machine. The injection unit shown includes a plastification cylinder 21, a drive motor for the screw conveyor 23, and a hydraulic injection cylinder by means of which the plastified material is injected into the closed die halves. The elements of the injection unit are aligned relative to one another by being mounted on two carrier rods 20. The injection unit is further provided with a pair of skid brackets 24 which support the unit on the upper face of the machine base 1 when it is not mounted to the die closing unit. An eye bracket 22' at the rear end of the injection unit permits attachment of the latter to the chain 18 of the service hoist 17.

The operation of relocating the injection unit from one operating position to another can thus be performed by one person alone, using the following procedure:

In order to remove the injection unit for its horizontal injection position behind the die closing unit, the injection unit is disconnected from the cylinder mount 4 and moved to the right (in FIG. 1) so as to disengage the mounting trunnions on the forward ends of the rods 20 from their mounting bores in the cylinder mount 4. The disengagement is facilitated by the fact that the entire injection unit remains in vertical alignment with the die closing unit, being supported on the machine base 1 by means of its skid brackets 24. The hook end of hoist chain 18 is then attached to the eye bracket 22' on the rear end of the injection unit. Between the die closing unit and the disengaged injection unit are then inserted two pivot support rods 13 whose forward ends engage the mounting bores in the cylinder mount 4 and whose rearward ends include pivot sockets 14 for the mounting trunnions of rods 20. The pivot support rods 13 thus provide a convenient pivot position for the lifting of the injection unit in such a way that the cylinders 10 and 11 do not interfere with the lifting operation. The electric chain hoist 17 can now be operated to pivot the injection unit upward (FIG. 1) until is is freely suspended on the lifting device. The latter can then be rotated around the vertical axis of column 15 so as to place the injection unit either laterally outside the machine base area, in order to be removed and replaced by another injection unit, or into vertical alignment with the injection unit mounting sockets 12'' on the forward end of mounting carriage 12. It should be understood, of course, that the bores 12'' or 12''', respectively, of the mounting sockets are so arranged that the mounting trunnions of the injection unit can be fitted therein and the injection unit is then firmly attached to carriage 12. As can be seen from FIG. 1, the rotatability of the lifting device and the radial displaceability of the chain hoist 17 relative to column 15 make it a simple operation to align the injection unit with the mentioned mounting bores of carriage 12.

The lifting device of the invention also makes it an easy one-person operation to transfer the injection unit from its vertical position to its horizontal position behind the die closing unit in a reverse procedure. Similarly, the lifting device may also be used to lift and install heavy dies. Its central location above the die closing unit renders the handling of dies easy and safe for both the operator and the costly die halves.

The fact that the lifting device requires only a relatively short column height and that it therefore can have a simple, light weight structure, offers the additional advantage that the lifting device may remain installed on the injection molding machine during production operations. On the other hand, the column and chain hoist may also be quickly and easily removed from the machine, by merely lifting the column 15 out of its socket 12'(FIG. 2). The lifting device thus requires a minimum of space, whether it is installed on the injection molding machine, or whether it is to be stowed away at some other place in the production facility.

In the case where the die closing unit is mounted vertically on the machine base 1, the support socket for the lifting device is attached to the uppermost surface of the cylinder mount in a way similar to that which was previously described herein. On the other hand, the lifting device may in this case also be directly mounted on the upper mounting face 29 of machine base 1.

It should be understood, of course, that the foregoing disclosure describes only a preferred embodiment of the invention and that it is intended to cover all changes and modifications of this example of the invention which fall within the scope of the appended claims.

I claim:

1. A lifting device for an injection molding machine whose die closing unit includes a stationary mount which is solidary with the stationary die support and mounted on the machine base, the device comprising in combination:
    a vertically extending support member arranged to be mounted on the injection molding machine so that its vertical axis is in approximate alignment with the longitudinal center plane of its die closing unit;
    a horizontally extending support arm on the upper end of the vertical support member;
    a service hoist suspended from the horizontal support arm, including controls for operating the hoist for the raising and lowering of heavy machine components;
    means for shifting the hoist along the horizontal support arm toward and away from the vertical support member; and
    means for rotating the horizontal support arm around the axis of the vertical support member.

2. A device as defined in claim 1, wherein
the vertical support member is mounted on the stationary mount of the die closing unit of the injection molding machine.

3. A device as defined in claim 1, wherein
the vertical support member is mounted on the stationary die support of the injection molding machine.

4. A device as defined in claim 1, wherein
the vertical support member is a tubular column which is rigidly connected to the horizontal support arm so as to rotate therewith; and
the rotating means for the horizontal support arm is in the form of a support socket for the rotatable vertical column and is arranged at the lower end portion of the latter so as to also serve as a mounting base for the lifting device.

5. A device as defined in claim 4, wherein
the support socket for the rotatable vertical column includes two vertically spaced bearing surfaces engaging the outer diameter of the column, and a thrust bearing engaging its lower end.

6. A device as defined in claim 4, wherein
the horizontal support arm is in the form of a tubular profile which has a longitudinal slot in its lowermost wall; and
the hoist shifting means includes a dolly which is arranged to reach into the interior of the tubular profile through the aforementioned slot, the dolly including at least two rollers which support the service hoist and its load against an inside wall of said profile.

7. A device as defined by claim 6, wherein
the tubular profile of the horizontal support arm is of rectangular outline so as to include a horizontal bottom wall.

8. A device as defined in claim 6, wherein
the service hoist includes electrical supply lines which run through the inside of the vertical column to the base of the injection molding machine, and the free end of the flexible hoist chain or cable is likewise accomodated inside the vertical column.

9. A device as defined in claim 4, wherein
the support socket for the rotatable vertical column is an integral part of a mounting carriage which is clampable and horizontally adjustable relative to the die closing unit in a direction parallel to the movement axis of the latter.

10. A device as defined in claim 9, wherein
the adjustable mounting carriage includes means for positioning an injection unit of the injection molding machine in vertical alignment with the separation plane of the injection molding die.

11. A device as defined in claim 10, wherein
the positioning means for the injection unit includes at least one pair of spaced vertical mounting bores in the carriage, these bores being adapted for engagement by a pair of matching mounting trunnions on the injection unit, the position of the injection unit thus being adjustable through a displacement of the mounting carriage.

12. A device as defined in claim 11, wherein
the mounting carriage includes two pairs of cooperating mounting bores of unequal diameter and spacing, the four bores being arranged at a horizontal distance from the support socket in a common plane which is perpendicular to the center axis of the mounting carriage.

13. A device as defined in claim 1, further including
means for pivotally supporting one end of a horizontally arranged injection unit of the machine against the die closing unit so as to permit lifting of the opposite end of the unit by the service hoist in a manner in which the injection unit is positionally determined during pivoting of the injection unit from its horizontal position into its vertical position, and vice versa, to prevent interference of the injection unit with the die closing unit.

14. A device as defined in claim 13, wherein
the injection unit supporting means is in the form of two rods which have each a pivot socket at one end and a mounting trunnion at the other end, the rods being arranged to engage matching mounting bores in the die closing unit which are normally engaged by mounting trunnions of the injection unit, the latter being capable of pivotingly engaging the pivot sockets of said rods when the rods are engaged in the die closing unit.

15. A device as defined in claim 2, wherein the vertical support member is mountable on an exposed upper horizontal face of the stationary mount of the die closing unit in both a horizontal arrangement, and an alternative vertical arrangement, of die closing unit on its machine base.

* * * * *